US010019506B1

(12) United States Patent
Li et al.

(10) Patent No.: US 10,019,506 B1
(45) Date of Patent: Jul. 10, 2018

(54) IDENTIFYING OBJECTS IN IMAGES (71) Applicant: Google LLC, Mountain View, CA (US)

(72) Inventors: Yuan Li, Fremont, CA (US); Hartwig Adam, Los Angeles, CA (US); Jia Deng, Ann Arbor, MI (US); Nan Ding, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 254 days.

(21) Appl. No.: 14/752,410

(22) Filed: Jun. 26, 2015

Related U.S. Application Data

(60) Provisional application No. 62/017,730, filed on Jun. 26, 2014.

(51) Int. Cl.
G06F 17/30 (2006.01)
G06T 11/20 (2006.01)
G06K 9/62 (2006.01)

(52) U.S. Cl.
CPC .... *G06F 17/30598* (2013.01); *G06F 17/3056* (2013.01); *G06K 9/6267* (2013.01); *G06T 11/206* (2013.01)

(58) Field of Classification Search
CPC ......... G06F 17/30598; G06F 17/30265; G06T 11/206; G06K 9/6267
See application file for complete search history.

(56) References Cited

U.S. PATENT DOCUMENTS

| 2003/0059106 | A1* | 3/2003 | Gutta | G06K 9/6273 382/158 |
| 2006/0098871 | A1* | 5/2006 | Szummer | G06K 9/00422 382/173 |
| 2011/0320454 | A1* | 12/2011 | Hill | G06F 17/30265 707/739 |
| 2014/0365525 | A1* | 12/2014 | Pfeifer | G06F 17/30539 707/777 |

OTHER PUBLICATIONS

Bi and Kwok, "Multi-label classification on tree-and dag-structured hierarchies," Proceedings of the 28th International Conference on Machine Learning (ICML-11). (2011) 17-24.

(Continued)

*Primary Examiner* — Etienne Leroux
(74) *Attorney, Agent, or Firm* — Fish & Richardson P.C.

(57) ABSTRACT

Methods, systems, and apparatus, including computer programs encoded on computer storage media, for identifying objects in images. One of the methods includes obtaining data identifying a plurality of object categories; obtaining relationship data for the plurality of object categories; determining a plurality of valid assignments from the relationship data; obtaining, for an image, a respective raw image score for each of the object categories, wherein the raw image score for each of the object categories represents an estimate of a likelihood that the image includes an image of an object that belongs to the object category; and generating a respective final score for each of the object categories from the raw image scores using the valid assignments, wherein the final score for each of the object categories represents the likelihood that the image includes an image of an object that belongs to the object category.

20 Claims, 5 Drawing Sheets

(56) References Cited

OTHER PUBLICATIONS

Bi and Kwok, "Mandatory leaf node prediction in hierarchical multilabel classification," NIPS. (2012) 153-161.
Chen et al., "Multi-label visual classification with label exclusive context," 2011 IEEE International Conference on Computer Vision (ICCV), 834-841, Nov. 6-13, 2011.
Lampert, "Maximum margin multi-label structured prediction," NIPS. vol. 11 (2011) 289-297.
Tousch et al., "Semantic hierarchies for image annotation: A survey," Pattern Recognition, 45(1):333-345, Jan. 2012.
Yedidia et al., "Understanding belief propagation and its generalizations," 2001 International Joint Conference on Artificial Intelligence, Nov. 2001, 36 pages.

* cited by examiner

IDENTIFYING OBJECTS IN IMAGES

CROSS-REFERENCE TO RELATED APPLICATION

This application claims priority to U.S. Provisional Application No. 62/017,730, filed on Jun. 26, 2014. The disclosure of the prior application is considered part of and is incorporated by reference in the disclosure of this application.

BACKGROUND

This specification relates to identifying objects in images.

Image classification systems can identify objects in images, i.e., classify input images as including objects from one or more object categories. Some image classification systems use one or more neural networks to classify an input image.

Neural networks are machine learning models, implemented on one or more computers, that employ one or more model layers to predict an output for a received input. Some neural networks include one or more hidden layers in addition to an input layer and an output layer. The output of each hidden layer is used as input to the next layer in the network, i.e., the next hidden layer or the output layer. In some neural networks, an output of a hidden layer may also be used as an input to the layer itself or to a layer other than the next layer in the network. Each layer of the network generates an output from a received input in accordance with current values of a respective set of parameters.

SUMMARY

This specification describes technologies that relate to classifying images as including images of objects from one or more object categories using relationship data that defines relationships between the object categories.

In general, one innovative aspect of the subject matter described in this specification can be embodied in methods that include the actions of obtaining data identifying a plurality of object categories; obtaining relationship data for the plurality of object categories, the relationship data defining subsumption relationships between object categories in the plurality of object categories and exclusion relationships between object categories in the plurality of object categories; determining a plurality of valid assignments from the relationship data, wherein each assignment classifies an object as belonging to one or more of the object categories, and wherein an assignment is a valid assignment if the classifications in the assignment do not violate any of the subsumption relationships and exclusion relationships defined by the relationship data; obtaining, for an image, a respective raw image score for each of the object categories, wherein the raw image score for each of the object categories represents an estimate of a likelihood that the image includes an image of an object that belongs to the object category; and generating a respective final score for each of the object categories from the raw image scores using the valid assignments, wherein the final score for each of the object categories represents the likelihood that the image includes an image of an object that belongs to the object category.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. Obtaining the respective raw image score for each of the object categories can include: processing the image or one or more patches from the image using a deep neural network to generate the raw image scores. The actions can further include generating, from the relationship data, a relationship graph that includes a respective node for each of the object categories, wherein the nodes for object categories that are identified in the relationship data as having a subsumption relationship are connected in the relationship graph with a directed edge, and wherein the nodes for object categories that are identified in the relationship as having an exclusion relationship are connected in the relationship graph with an undirected edge. Determining a plurality of valid assignments can include determining a state space of the relationship graph, wherein the state space of the relationship graph includes each valid assignment that does not violate any of the relationships defined by the relationship graph. Generating the respective final score for each of the object categories using the valid assignments can include: determining, using the raw image scores, a respective assignment score for each of the valid assignments in the state space for the relationship graph; and determining, from the assignment scores, the final scores for the object categories. Determining the final scores for the object categories can include: generating the final score for each of the object categories by combining the assignment scores for each valid assignment in the state space for the relationship graph that classifies the object as belonging to the object category.

The actions can further include: generating a minimally sparse equivalent graph to the relationship graph, wherein generating the minimally sparse equivalent graph comprises removing redundant edges from the relationship graph; and generating a maximally dense equivalent graph to the relationship graph, wherein generating the maximally dense equivalent graph comprises adding additional redundant edges to the relationship graph.

A directed edge can be a redundant edge if an alternative path exists in the relationship graph from an outgoing edge of the directed edge to an incoming edge of the directed edge, and an undirected edge can be a redundant edge if another undirected edge connects ancestors of the nodes connected by the undirected edge. Determining a plurality of valid assignments from the relationship data can include: generating a junction tree of the minimally sparse graph; identifying each clique of the junction tree; and determining a respective state space for each clique of the junction tree, wherein the respective state space for each clique of the junction tree includes assignments that do not violate any of the exclusion or subsumption relationships defined by the relationship graph between the nodes in the clique. Determining the respective state space for each clique of the junction tree can include: determining the subgraph of the maximally dense equivalent that is induced by the clique; determining a state space of the subgraph of the maximally dense equivalent; and using the state space of the subgraph as the state space of the clique of the junction tree. Generating a respective final score for each of the object categories from the raw image scores using the valid assignments can include modifying the raw image scores by performing message passing on the junction tree, and wherein performing message passing on the junction tree comprises performing message passing computations only on assignments in the state space for each of the cliques. Modifying the raw image scores by performing message passing on the junction tree can include: performing two passes of sum-product message passing on the junction tree.

The subject matter described in this specification can be implemented in particular embodiments so as to realize one or more of the following advantages. An image classification system can classify images as belonging to certain object categories from a predetermined set of object categories in a manner that is consistent with known relationships between the object categories. By classifying images in this manner, the image classification system can accurately classify input images. Additionally, the image classification system can accurately classify input images that include objects that belong to subcategories that are not included in the predetermined set of categories. For example, if the predetermined set of object categories includes a dog category and categories for several different dog breeds, the system can accurately classify an image of a new breed of dog as belonging to the dog category but not belonging to any of the dog breed categories. The image classification system can classify images in a manner that is consistent with known relationships without a significant increase in processing time over existing image classification systems. The image classification system can perform zero-shot classification. That is, during training, some categories have no training examples, i.e., the training data for the image classification system does not include any images of objects that belong to those categories. These categories are called "unseen" categories. The rest of the categories have one or more training examples and are called "seen" categories. The relations between seen and unseen categories are known, i.e., are specified in relationship data received by the image classification system. Using the relationship data, given a new image, the system can output scores for the unseen categories despite the fact that they have no training examples.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
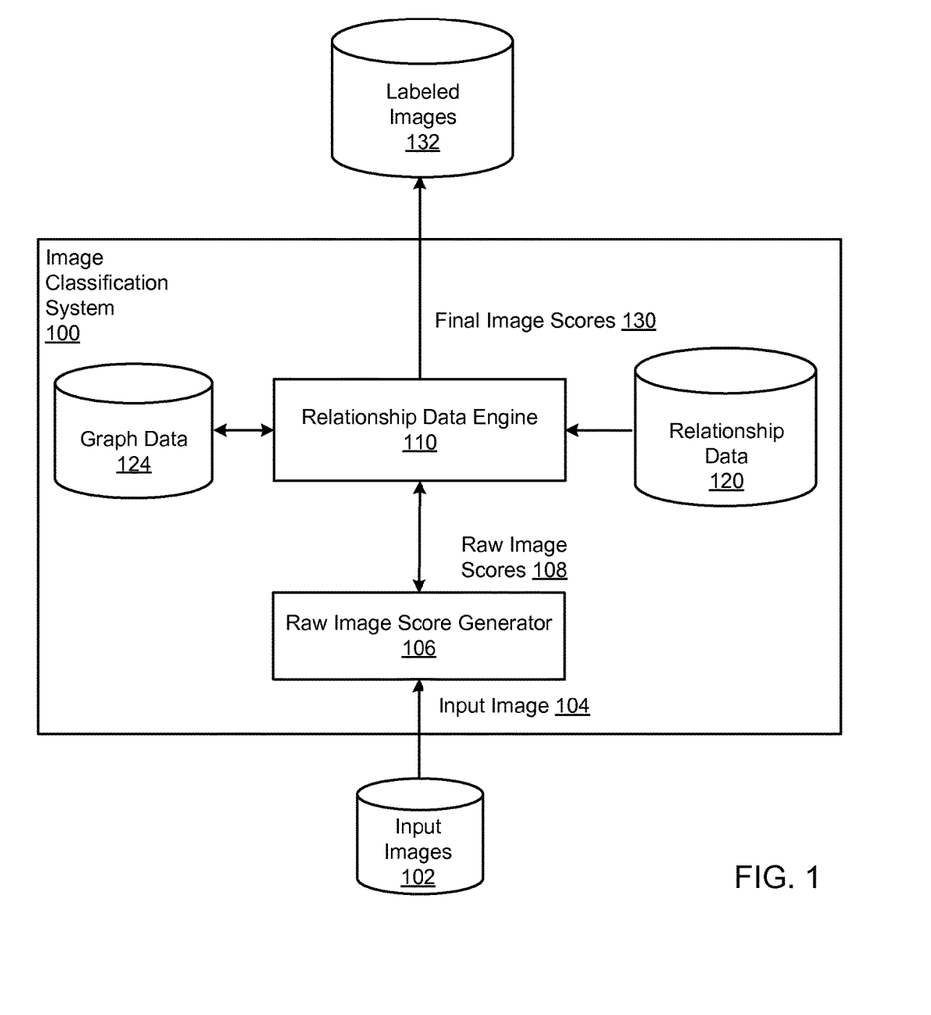
FIG. 1 shows an example image classification system.

FIG. 1 shows an example image classification system 100. The image classification system 100 is an example of a system implemented as computer programs on one or more computers in one or more locations, in which the systems, components, and techniques described below are implemented.

The image classification system 100 receives input images, e.g., an input image 104 from an input image database 102, and, for each input image, generates a respective score for each object category of a predetermined set of object categories. For example, the image classification system 100 can generate final image scores 130 for the input image 104. The final image score for a given category represents a likelihood that the input image includes an image of an object in the category. For example, if one of the object categories is horses, the final image score for the horses category represents a likelihood that the input image contains an image of a horse. The object categories may be generic, e.g., horses, or specific, e.g., George Washington. The object categories may include categories at different levels of generality, e.g., the object categories can include a dog category, a puppy category, and a German Shepherd category. Optionally, the final image scores can also include a score for a "none of the above" category that represents the likelihood that the input image does not contain an image of an object from any of the object categories in the predetermined set of object categories.

Once the final scores for a given input image are generated, the image classification system 100 may associate the input image with a label for one or more of the highest-scoring object categories, e.g., with a label for the highest-scoring object category or with a respective label for each category that has a final image score over a threshold value. The labels are predetermined text labels for the object categories, e.g., a "dog" label for the dog object category or a "German Shepherd" label for the German Shepherd object category. The system then stores the input image in a labeled image database 132, e.g., by storing the image and data that associates the image with the label in the labeled image database 132 or by augmenting the image with label metadata and storing the augmented images in the labeled image database 132. Instead of or in addition to storing the input image, the system can provide data identifying the labels and, optionally, the final scores to an external system for use for some immediate purpose.

The image classification system 100 includes a raw image score generator 106 that receives an input image or one or more patches from the input image and processes the input image or the patches to generate a respective raw image score for each of the object categories. The raw image score for a given object category represents an estimate, e.g., as estimated by the raw image score generator 106, of the likelihood that the image includes an image of an object that belongs to the object category. For example, the raw image score generator 106 may receive the input image 104 or one or more patches from the input image 104 and generate raw image scores 108 for the input image 104. The raw image score generator 106 may be a computer system implementation of any conventional machine learning model or any other image classification system that has been configured to receive data for an input image, i.e., an input image or one or more patches from the input image, and process the data for the input image to generate the raw image scores for the input image. For example, the raw image score generator 106 may be a shallow neural network that includes a single layer that applies a transformation to the data for the input image to generate the raw image scores 108 in accordance with current values of parameters of the neural network. As another example, the raw image score generator 106 may be a deep neural network that includes multiple layers that each have a respective set of parameters and that each apply a non-linear transformation to input received from a previous layer, and possibly other input, in the deep neural network.

The image classification system 100 also includes a relationship data engine 110 that receives the raw image scores generated by the raw image score generator 104 and modifies the raw image scores to generate the final scores for the input image. For example, the relationship data engine 110 can receive the raw image scores 108 and modify the raw image scores 108 to generate the final image scores 130 for the input image 104.

The relationship data engine 110 generates the final image scores using relationship data 120. The relationship data 120 defines relationships between the object categories in the predetermined set of object categories. In particular, the relationship data 120 defines subsumption relationships between object categories and exclusion relationships between object categories. A subsumption relationship between two object categories specifies that one of the categories must subsume the other category. That is, that if an object belongs to the subsumed category, it must also belong to the subsuming category. An exclusion relationship between two object categories specifies that the two categories are exclusive of one another. That is, if an object belongs to either one of the two categories, it cannot also belong to the other category.

In order to use the relationship data to generate final image scores for received images, the relationship data engine 110 generates a relationship graph from the relationship data 120 and stores the relationship graph in a relationship graph data repository 124. The relationship graph reflects the relationships defined by the relationship data 120; the nodes and edges of the graph can be represented in the repository 124 in any convenient form. In particular, the relationship graph includes a node for each of the object categories. Nodes for object categories that are included in a relationship defined by the relationship data 120 are connected by an edge that represents the defined relationship. Generating a relationship graph from relationship data is described in more detail below with reference to FIG. 3.

Once the relationship graph has been generated, the relationship data engine 110 can use the relationship graph to generate final scores for input images by modifying raw image scores received from the raw image score generator 106 in accordance with the relationships specified in the relationship graph. Using the relationship graph to generate final scores for an input image is described in more detail below with reference to FIGS. 3-5.

Figure 2:
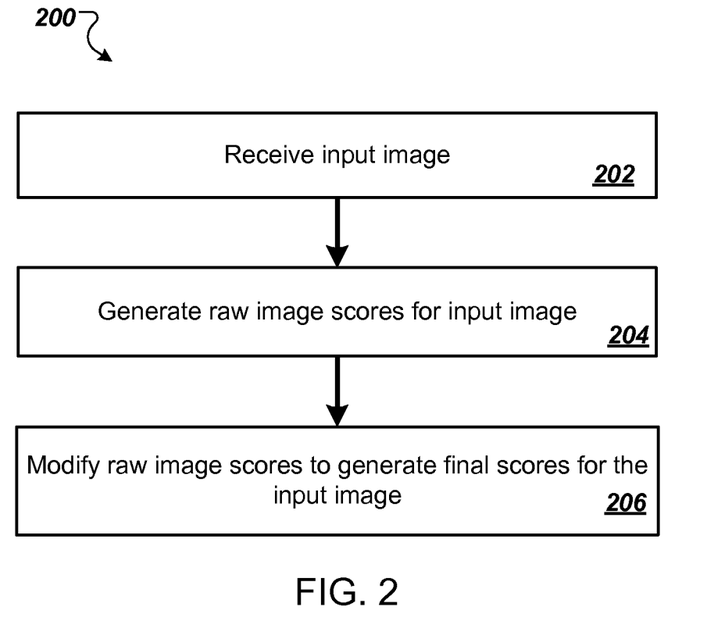
FIG. 2 is a flow diagram of an example process for generating final image scores for an input image.

FIG. 2 is a flow diagram of an example process 200 for generating final image scores for an input image. For convenience, the process 200 will be described as being performed by a system of one or more computers located in one or more locations. For example, an image classification system, e.g., the image classification system 100 of FIG. 1, appropriately programmed in accordance with this specification, can perform the process 200.

The system receives an input image or one or more patches from the input image (step 202) and generates raw image scores for the input image (step 204). The raw image scores include a respective score for each of a set of object categories. The system generates the raw image scores by processing the input image or the patches from the input image using a conventional machine learning model. For example, the system can process the input image or the patches from the input image through a deep neural network to generate the raw image scores.

The system modifies the raw image scores to generate final image scores for the input image (step 206). The final image scores include a respective score for each of the set of object categories, with the score for each object category representing a likelihood that the input image includes an image of an object that belongs to the object category. The system generates the final image scores using relationship data that defines relationships between the object categories. In particular, the system modifies the raw image scores using a relationship graph that has been constructed from the relationship data to generate the final scores. Using the relationship graph to generate final image scores is described below with reference to FIGS. 3 and 5.

Figure 3:
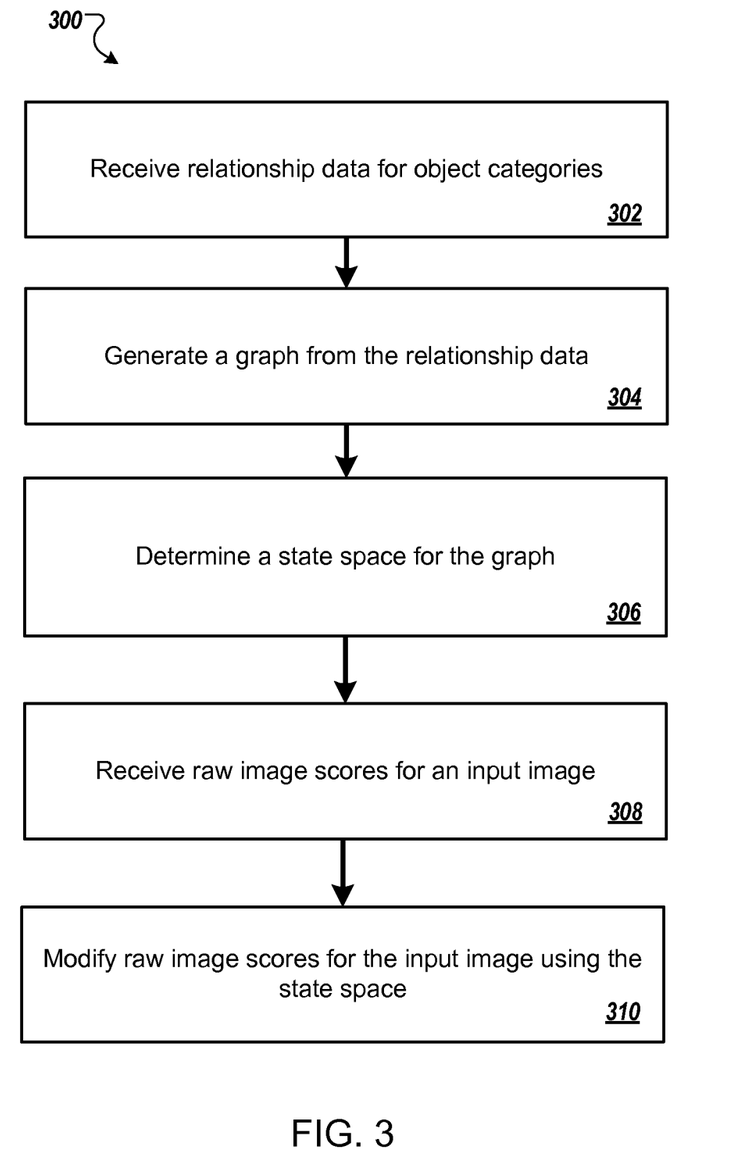
FIG. 3 is a flow diagram of an example process for modifying raw image scores for an input image using a relationship graph.

FIG. 3 is a flow diagram of an example process 300 for modifying raw image scores for an input image using a relationship graph. For convenience, the process 300 will be described as being performed by a system of one or more computers located in one or more locations. For example, an image classification system, e.g., the image classification system 100 of FIG. 1, appropriately programmed in accordance with this specification, can perform the process 300.

The system receives relationship data for a set of object categories (step 302).

The system generates a relationship graph from the relationship data (step 304). In particular, the system generates a node for each object category in the set of object categories. For each relationship between two object categories defined by the relationship data, the system connects the nodes for the object categories with an edge that represents the relationship between the object categories.

If the relationship defined by the relationship data is a subsumption relationship that specifies that an object that belongs to a subsumed object category must also belong to a subsuming object category, the system connects the two nodes with a directed edge that points from the node for the subsuming object category to the node for the subsumed object category.

If the relationship defined by the relationship data is an exclusion relationship that specifies that an object that belongs to one of the objected category must not belong to the other object category, the system connects the two nodes with an undirected edge.

Figure 4:
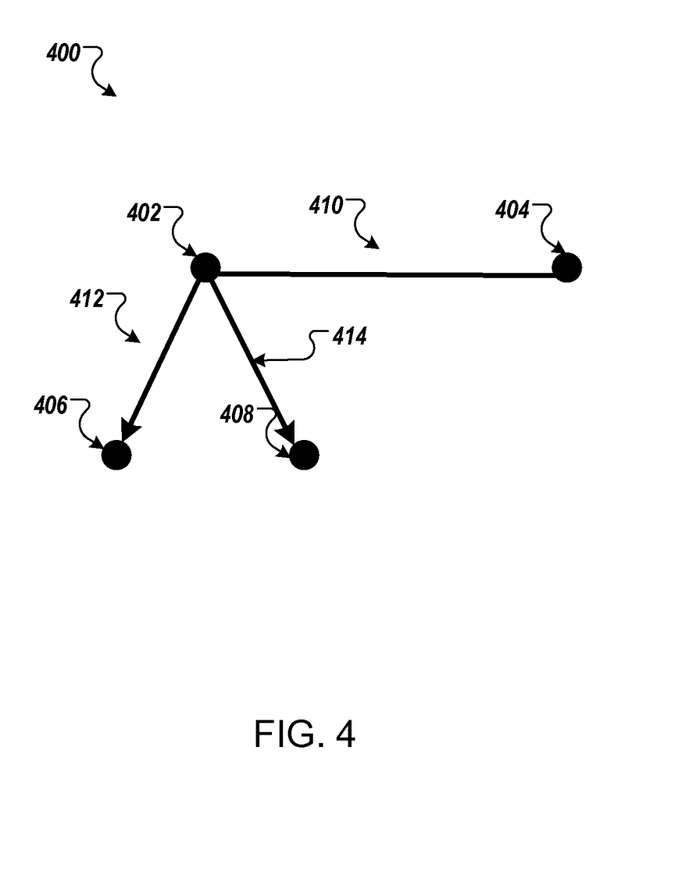
FIG. 4 shows a portion of an example relationship graph.

FIG. 4 shows a portion 400 of an example relationship graph. The portion 400 includes a node 402 for a dog category, a node 404 for a cat category, a node 406 for a puppy category, and a node 408 for a German Shepherd category. The system has connected node 402 to the node 404 with an undirected edge 410, i.e., because the relationship data specified that the dog category has an exclusion relationship with the cat category. The system has connected node 402 to node 406 with a directed edge 412 that points from the node 402 to the node 406, i.e., because the relationship data specified that the dog category has a subsumption relationship with the puppy category, with the dog category subsuming the puppy category. The system has connected node 402 to node 408 with a directed edge 414 that points from the node 402 to the node 408, i.e., because the relationship data specified that the dog category has a subsumption relationship with the German Shepherd category. However, the system has not connected the node 406 to the node 408, i.e., because the relationship data did not specify a subsumption or an exclusion relationship between the puppy category and the German Shepherd category. Similarly, the system has not connected either of the nodes 406 or the nodes 408 to the node 404, i.e., because the relationship data did not specify a subsumption or an exclusion relationship between either the puppy category or the German Shepherd category and the cat category.

Returning to the description of FIG. 3, the system determines a state space for the relationship graph (step 306). The state space for the relationship graph is the set of possible valid assignments for an object in an image based on the relationships defined by the edges of the relationship graph. An assignment is a possible classification of an object across the object categories. That is, each assignment classifies an object in an image as belonging to a subset of the object categories and as not belonging to the remainder of the object categories. For example, if the set of object categories is {cat, dog, puppy, German Shepherd}, one assignment can be represented by {0, 1, 0, 1}. In the assignment {0, 1, 0, 1}, the object is classified as belonging to the dog category and the German Shepherd category, but not to the cat category or the puppy category. Another assignment can be represented by {1, 1, 0, 0}. In the assignment {1, 1, 0, 0}, the object is classified as belonging to the cat category and the dog category, but not to the puppy category or the German Shepherd category An assignment is valid if none of the object category classifications in the assignment violate any of the relationships defined by the relationship graph. In particular, an assignment is valid only if (i) the object is not classified as belonging to any two object categories between which an exclusion relationship is defined by the relationship graph and (ii) for any object category that the object is classified as belonging to, the object is also classified as belonging to each ancestor of the object category.

The relationship graph defines an exclusion relationship between two object categories if (i) the nodes for the two object categories are connected by an undirected edge, (ii) an ancestor of one node is connected to an ancestor of the other node by an undirected edge, or (iii) an ancestor of one node is connected to the other node by an undirected edge.

An ancestor of a particular object category is any object category for which the node is connected to the node for the particular object category by a directed path that starts at the node for the object category and ends at the node for the particular object category. A directed path that starts at a first node and ends at a node is a sequence of directed edges that begins with a directed edge pointing from the first node and ends with a directed edge pointing to the second node. For example, a node for an object category that subsumes another object category is an ancestor to the node for the other object category. Similarly, a node for an object category that subsumes an object category that subsumes another object category is an ancestor to the node for the other object category.

Thus, an assignment that classifies an object as belonging to an object category but not belonging to any object category subsumed by the object category can still be considered a valid assignment by the system.

The system receives raw image scores for an input image (step 308).

The system modifies the raw image scores for the input image using the state space for the relationship graph (step 310). In particular, the system determines an assignment score for each valid assignment in the state space from the raw image scores. Generally, the system computes the score for a valid assignment by computing, for each object category that the object is classified as belonging to in the valid assignment, a respective output of a predetermined function of the raw image score for the object category. The system then computes the assignment score for the valid assignment by computing the product of the outputs of the function. For example, in some implementations, the assignment score AS for a valid assignment y and an input image x satisfies:

$$AS(y \mid x) = \prod_i e^{IS_i[y_i=1]}$$

where i ranges from 1 to the total number of object categories, $IS_i$ is the raw image score for the object category i, and $[y_i=1]$ indicates that the raw image score for the object category i is only considered if the object is classified as belonging to the object category i in the assignment y, and the predetermined function is $\exp(IS_i)$. Optionally, after the assignment scores for each valid assignment have been computed, the system normalizes the assignment scores, e.g., by dividing each assignment score by the sum of the assignment scores for all the valid assignments in the state space.

The system then computes the final score for each of the object categories from the assignment scores by marginalizing out all other object categories. That is, the system determines the final score for a given object category by summing the assignment scores for each valid assignment that classifies the object as belonging to the given object category. By computing the final scores for the object categories from the assignment scores for the valid assignments, the system guarantees that the final scores generated by the system are consistent with the relationships defined by the relationship graph. For example, the final score for an object category that subsumes another object category will always be at least as large as the final score for the other object category. As another example, in implementations where the assignment scores are normalized and the final scores for each category are probabilities, the sum of the scores for two categories that are exclusive of one another will never exceed one. Additionally, because an assignment that classifies an object as belonging to an object category but not belonging to any object category subsumed by the object category can still be considered a valid assignment by the system, the sum of the scores for all of the categories that are subsumed by a given category can be smaller than the score for the given category, i.e., to account for the likelihood that the image includes an image of an object that belongs to a novel subcategory of the given category.

In some cases, however, it may not be feasible or advantageous to compute the final scores for a received input image using the state space of the relationship graph. For example, when the number of object categories is large and the relationships between the object categories very complex, computing the final scores for images directly from the state space of the relationship graph may not be desirable, e.g., because the amount of computation necessary to determine the state space, to use each valid assignment in the state space to compute final scores, or both, is excessive. In these cases, the system can optimize the computation of the final scores by computing minimally sparse and maximally dense equivalents of the relationship graph and using those equivalents to determine the final scores for an input image.

Figure 5:
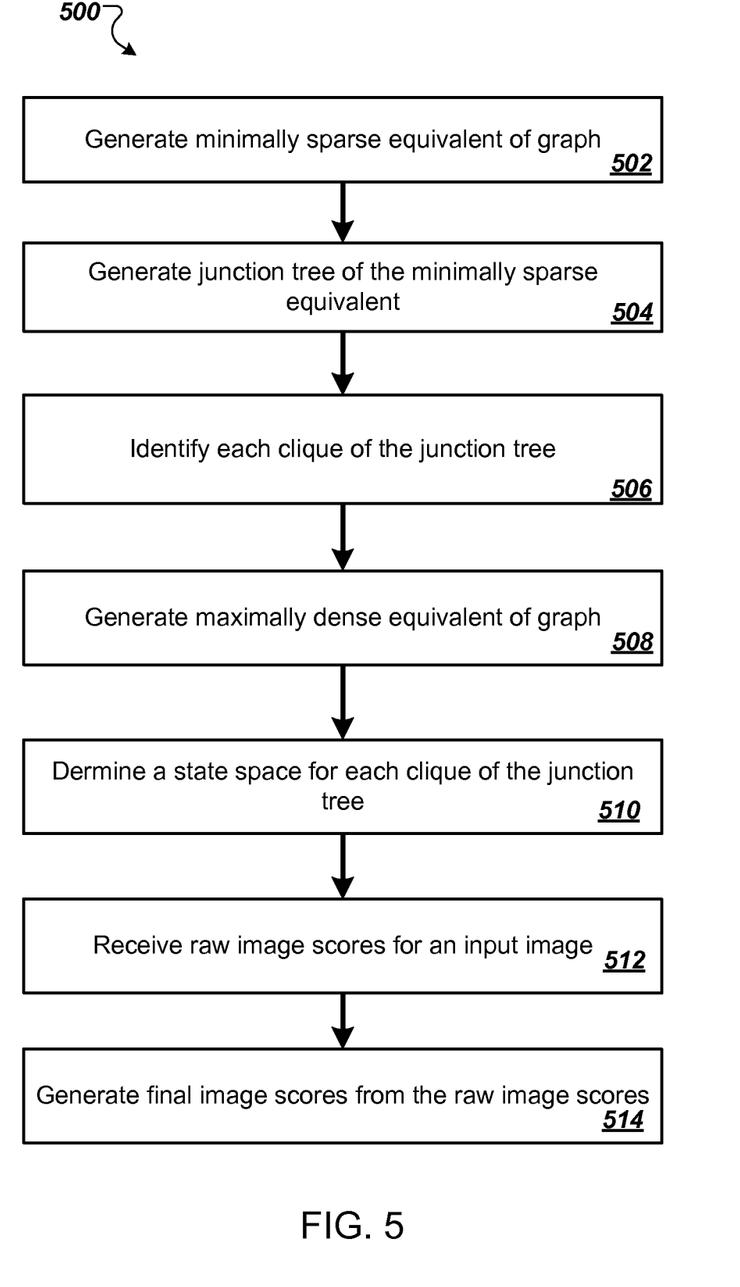
FIG. 5 is a flow diagram of an example process for generating final image scores for an input image using minimally sparse and maximally dense equivalents of a relationship graph.

FIG. 5 is a flow diagram of an example process 500 for generating final image scores for an input image using minimally sparse and maximally dense equivalents of a relationship graph. For convenience, the process 500 will be described as being performed by a system of one or more computers located in one or more locations. For example, an image classification system, e.g., the image classification system 100 of FIG. 1, appropriately programmed in accordance with this specification, can perform the process 500.

The system generates a minimally sparse equivalent graph of the relationship graph by removing all redundant edges from the relationship graph (step 502). A redundant edge is an edge that can be removed from the relationship graph without changing the state space of the relationship graph. In particular, a directed edge that points from a subsuming node to a subsumed node is redundant only if there is another directed path from the subsuming node to the subsumed node that does not include the directed edge. An undirected edge that connects to two nodes is redundant only if (i) a different undirected edge connects an ancestor of one of the nodes to an ancestor of the other node or (ii) a different undirected edge connects an ancestor of one of the nodes to the other node.

The system generates a junction tree of the minimally sparse equivalent graph (step 504).

The system identifies each clique of the junction tree (step 506). A clique of a junction tree is a subset of the nodes in the junction tree such that each node in the subset is connected to every other node in the subset by an edge.

The system generates a maximally dense equivalent graph of the relationship graph by adding each possible redundant edge to the relationship graph (step 508). That is, the system adds to the relationship graph each edge that can be added to the relationship graph without changing the state space of the relationship graph. The system can generate the maximally dense equivalent graph from the relationship graph by iteratively adding redundant edges until no additional edges can be added that satisfy the criteria for being considered redundant.

The system determines a state space for each clique of the junction tree (step 510). The state space of a clique of the junction tree includes assignments that do not violate any of the exclusion or subsumption relationships defined by the relationship graph between the nodes in the clique.

In particular, to determine the state space of a clique, the system determines the subgraph of the maximally dense equivalent graph that is induced by the clique. The subgraph of the maximally dense equivalent graph that is induced by the clique is the portion of the maximally dense equivalent graph that includes the same nodes as the clique of the junction tree and each edge for which both endpoints are in the clique of the junction tree. The system then computes the state space of the induced subgraph and uses the computed state space as the state space of the clique. Because the subgraph of the maximally dense equivalent graph includes each possible redundant edge between the nodes in the subgraph, computation of the state space is simplified.

The system receives raw image scores for an input image (step 512).

The system generates final image scores from the raw image scores by performing message passing on the junction tree for the minimally sparse equivalent (step 514). That is, the system performs a message passing technique on the junction tree that uses the raw image scores and the state space for each of the cliques of the junction tree to compute final scores for each of the object categories. In particular, when performing the message passing technique, the system performs computation on only the valid states included in the state space for each of the cliques of the junction tree. For example, the system can perform two passes of sum-product message passing on the junction tree to determine the final image scores. Example sum-product message passing techniques that can be used to generate the final image scores from the raw image scores are described in more detail in *Understanding Belief Propagation and its Generalizations*, Jonathan S. Yedidia, William T. Freeman, and Yair Weiss, 2001 International Joint Conference on Artificial Intelligence, accessible at http://www.merl.com/publications/docs/TR2001-22.pdf.

Thus, by generating final image scores using the process 500, the system performs the computation necessary to generate the final image scores for a received image using the junction tree of a sparse graph, i.e., the junction tree of the minimally sparse equivalent graph, while determining the state space of the cliques of the junction tree using a dense equivalent of the sparse graph, i.e., the maximally dense equivalent graph.

In some implementations, the system performs steps 502-508 of the process 500 offline, i.e., before the raw image scores for any images have been received, and performs steps 510-514 for each new set of raw image scores that is received by the system.

The processes 200, 300, and 500 can be performed to classify an image for which the desired classification is not known, i.e., an input image that has not yet been classified as including images of any objects. When the raw image score generator is a machine learning model that generates the raw image scores in accordance with current values of parameters, the processes 200, 300, and 500 can also be performed to classify an input image from a set of training data, i.e., a set of input images for which the output that should be predicted by the system is known, in order to train the system, i.e., to determine trained values for the parameters of the machine learning model used to generate the raw image scores for input images. For example, when the machine learning model is a deep neural network, the processes can be performed on inputs selected from a set of training data as part of a backpropagation training technique to determine trained values of the parameters of each layer of the deep neural network.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   maintaining data representing a junction tree of a relationship graph,
      wherein the relationship graph includes nodes, directed edges, and undirected edges,
      wherein each node in the relationship graph represents a respective object category of a plurality of object categories;
      wherein each directed edge in the relationship graph connects a respective pair of nodes that represent object categories that have a subsumption relationship,
      wherein each undirected edge in the relationship graph connects a respective pair of nodes that represent object categories that have an exclusion relationship, and
      wherein the junction tree comprises a plurality of cliques that each include a respective subset of connected nodes from the relationship graph;
   maintaining data specifying a respective state space for each of the cliques of the junction tree, wherein the state space for each of the cliques includes assignments that each define a respective combination of object categories that can be assigned to an object without violating any of the exclusion or subsumption relationships defined by the relationship graph between the connected nodes in the clique,
   receiving input image data for an input image;
   processing the input image data using a deep neural network, wherein the deep neural network is configured to process the input image data to generate a respective raw image score for each of the object categories, wherein the raw image score for each of the object categories represents an initial estimate of a likelihood that the input image depicts an object that belongs to the object category;
   generating a respective final score for each of the object categories from the raw image scores by performing message passing on the junction tree using the raw image scores, wherein the final score for each of the object categories represents an updated estimate of the likelihood that the input image depicts an object that belongs to the object category, whereby the message passing modifies the raw image scores according to the respective state spaces for the cliques of the junction tree; and
   determining a classification for the input image based on the final scores for the object categories.

2. The method of claim 1, wherein the input image data comprises the input image or one or more patches from the input image.

3. The method of claim 1, further comprising:
   obtaining relationship data for the plurality of object categories, the relationship data defining subsumption relationships between first object categories in the plurality of object categories and exclusion relationships between second object categories in the plurality of object categories; and
   generating, from the relationship data, an initial relationship graph that includes a respective node for each of the object categories, wherein the nodes for pairs of object categories that are identified in the relationship data as having a subsumption relationship are connected in the relationship graph with a directed edge, and wherein the nodes for pairs of object categories that are identified in the relationship data as having an exclusion relationship are connected in the relationship graph with an undirected edge.

4. The method of claim 3,
   wherein the relationship graph is a minimally sparse equivalent graph to the initial relationship graph that does not include any redundant edges from the initial relationship graph.

5. The method of claim 4, wherein a particular directed edge is a redundant edge if an alternative path exists in the initial relationship graph from an outgoing edge of the particular directed edge to an incoming edge of the particular directed edge, and wherein a particular undirected edge is a redundant edge if another undirected edge in the initial relationship graph connects ancestors of the nodes connected by the particular undirected edge.

6. The method of claim 4, further comprising:
   determining the respective state space for each clique of the junction tree, wherein the determining comprises:
   determining a subgraph of a maximally dense equivalent graph that is induced by the clique, wherein the maximally dense equivalent graph is an augmented relationship graph that includes each node and edge in the initial relationship graph and additional redundant edges;
   determining a state space of the subgraph of the maximally dense equivalent graph; and
   using the state space of the subgraph of the maximally dense equivalent graph as the state space of the clique of the junction tree.

7. The method of claim 1, wherein performing message passing on the junction tree comprises performing message passing computations only on assignments in the state space for each cliques.

8. The method of claim 1, wherein performing the message passing comprises:
   performing two passes of sum-product message passing on the junction tree.

9. A system comprising one or more computers and one or more storage devices storing instructions that when executed by the one or more computers cause the one or more computers to perform operations comprising:
   maintaining data representing a junction tree of a relationship graph,
      wherein the relationship graph includes nodes, directed edges, and undirected edges,
      wherein each node in the relationship graph represents a respective object category of a plurality of object categories,
      wherein each directed edge in the relationship graph connects a respective pair of nodes that represent object categories that have a subsumption relationship,
      wherein each undirected edge in the relationship graph connects a respective pair of nodes that represent object categories that have an exclusion relationship, and
      wherein the junction tree comprises a plurality of cliques that each include a respective subset of connected nodes from the relationship graph;
   maintaining data specifying a respective state space for each of the cliques of the junction tree, wherein the state space for each of the cliques includes assignments that each define a respective combination of object categories that can be assigned to an object without violating any of the exclusion or subsumption relationships defined by the relationship graph between the connected nodes in the clique,
wherein each assignment classifies an object as belonging to one or more of the object categories
receiving input image data for an input image;
processing the input image data using a deep neural network, wherein the deep neural network is configured to process the input image data to generate a respective raw image score for each of the object categories, wherein the raw image score for each of the object categories represents an initial estimate of a likelihood that the input image depicts an object that belongs to the object category;
generating a respective final score for each of the object categories from the raw image scores by performing message passing on the junction tree using the raw image scores, wherein the final score for each of the object categories represents an updated estimate of the likelihood that the input image depicts an object that belongs to the object category, whereby the message passing modifies the raw image scores according to the respective state spaces for the cliques of the junction tree; and
determining a classification for the input image based on the final scores for the object categories.

10. The system of claim 9, the operations further comprising:
obtaining relationship data for the plurality of object categories, the relationship data defining subsumption relationships between first object categories in the plurality of object categories and exclusion relationships between second object categories in the plurality of object categories; and
generating, from the relationship data, an initial relationship graph that includes a respective node for each of the object categories, wherein the nodes for pairs of object categories that are identified in the relationship data as having a subsumption relationship are connected in the relationship graph with a directed edge, and wherein the nodes for pairs of object categories that are identified in the relationship data as having an exclusion relationship are connected in the relationship graph with an undirected edge.

11. The system of claim 10, wherein the relationship graph is a minimally sparse equivalent graph to the initial relationship graph.

12. The system of claim 11, the operations further comprising:
determining the respective state space for each clique of the junction tree, wherein the determining comprises:
determining a subgraph of a maximally dense equivalent graph that is induced by the clique, wherein the maximally dense equivalent graph is an augmented relationship graph that includes each node and edge in the initial relationship graph and additional redundant edges;
determining a state space of the subgraph of the maximally dense equivalent graph; and
using the state space of the subgraph of the maximally dense equivalent graph as the state space of the clique of the junction tree.

13. The system of claim 9, wherein performing message passing on the junction tree comprises performing message passing computations only on assignments in the state space for each of the cliques.

14. The system of claim 9, wherein performing the message passing comprises:
performing two passes of sum-product message passing on the junction tree.

15. A computer program product encoded on one or more non-transitory computer storage media, the computer program product comprising instructions that when executed by the one or more computers cause the one or more computers to perform operations comprising:
maintaining data representing a junction tree of a relationship graph,
wherein the relationship graph includes nodes, directed edges, and undirected edges,
wherein each node in the relationship graph represents a respective object category of a plurality of object categories,
wherein each directed edge in the relationship graph connects a respective pair of nodes that represent object categories that have a subsumption relationship,
wherein each undirected edge in the relationship graph connects a respective pair of nodes that represent object categories that have an exclusion relationship, and
wherein the junction tree comprises a plurality of cliques that each include a respective subset of connected nodes from the relationship graph;
maintaining data specifying a respective state space for each of the cliques of the junction tree, wherein the state space for each of the cliques includes assignments that each define a respective combination of objective categories that can be assigned to an object without violating any of the exclusion or subsumption relationships defined by the relationship graph between the connected nodes in the clique,
receiving input image data for an input image,
processing the input image data using a deep neural network, wherein the deep neural network is configured to process the input image data to generate a respective raw image score for each of the object categories, wherein the raw image score for each of the object categories represents an initial estimate of a likelihood that the input image depicts an object that belongs to the object category;
generating a respective final score for each of the object categories from the raw image scores by performing message passing on the junction tree using the raw image scores, wherein the final score for each of the object categories represents an updated estimate of the likelihood that the input image depicts an object that belongs to the object category, whereby the message passing modifies the raw image scores according to the respective state spaces for the cliques of the junction tree; and
determining a classification for the input image based on the final scores for the object categories.

16. The computer program product of claim 15, the operations further comprising:
obtaining relationship data for the plurality of object categories, the relationship data defining subsumption relationships between first object categories in the plurality of object categories and exclusion relationships between second object categories in the plurality of object categories; and
generating, from the relationship data, an initial relationship graph that includes a respective node for each of the object categories, wherein the nodes for pairs of object categories that are identified in the relationship data as having a subsumption relationship are connected in the relationship graph with a directed edge, and wherein the nodes for pairs of object categories that are identified in the relationship data as having an exclusion relationship are connected in the relationship graph with an undirected edge.

17. The computer program product of claim 16, wherein the relationship graph is a minimally sparse equivalent graph to the initial relationship graph that does not include any redundant edges from the initial relationship graph.

18. The computer program product of claim 17, the operations further comprising:
   determining the respective state space for each clique of the junction tree, wherein the determining comprises:
   determining a subgraph of a maximally dense equivalent graph that is induced by the clique, wherein the maximally dense equivalent graph is an augmented relationship graph that includes each node and edge in the initial relationship graph and additional redundant edges;
   determining a state space of the subgraph of the maximally dense equivalent graph; and
   using the state space of the subgraph of the maximally dense equivalent graph as the state space of the clique of the junction tree.

19. The computer program product of claim 15, wherein performing message passing on the junction tree comprises performing message passing computations only on assignments in the state space for each of the cliques.

20. The computer program product of claim 15, wherein performing the message passing comprises:
   performing two passes of sum-product message passing on the junction tree.

* * * * *